US012374851B2

(12) United States Patent
Takeshita et al.

(10) Patent No.: US 12,374,851 B2
(45) Date of Patent: Jul. 29, 2025

(54) OPTICAL AMPLIFICATION APPARATUS AND OPTICAL AMPLIFICATION METHOD

(71) Applicant: NEC Corporation, Tokyo (JP)

(72) Inventors: Hitoshi Takeshita, Tokyo (JP); Keiichi Matsumoto, Tokyo (JP); Emmanuel Le Taillandier De Gabory, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1157 days.

(21) Appl. No.: 17/281,329

(22) PCT Filed: Sep. 27, 2019

(86) PCT No.: PCT/JP2019/038083
§ 371 (c)(1),
(2) Date: Mar. 30, 2021

(87) PCT Pub. No.: WO2020/071262
PCT Pub. Date: Apr. 9, 2020

(65) Prior Publication Data
US 2021/0399514 A1     Dec. 23, 2021

(30) Foreign Application Priority Data
Oct. 1, 2018  (JP) ................................ 2018-186581

(51) Int. Cl.
*H01S 3/10*       (2006.01)
*G02B 6/02*       (2006.01)
(Continued)

(52) U.S. Cl.
CPC ............ *H01S 3/10* (2013.01); *G02B 6/02042* (2013.01); *G02B 6/293* (2013.01); *H01S 3/067* (2013.01); *H01S 3/09* (2013.01)

(58) Field of Classification Search
CPC ........... G02B 6/02042; H01S 3/094084; H01S 3/094007; H01S 3/067; H01S 3/09
See application file for complete search history.

(56) References Cited

U.S. PATENT DOCUMENTS 6,583,925 B1 * 6/2003 Delavaux ............ H01S 3/06754
359/341.32
11,228,155 B2 * 1/2022 Shimakawa ........ H01S 3/06708
(Continued)

FOREIGN PATENT DOCUMENTS

EP        1245973 A1 * 10/2002  ............. G02B 6/262
JP     H01-095580 A      4/1989
(Continued)

OTHER PUBLICATIONS

Machine translation of JP-2017005083-A (Year: 2017).*
(Continued)

*Primary Examiner* — Yuqing Xiao
*Assistant Examiner* — Zhengqing Qi

(57) ABSTRACT

An optical amplification apparatus includes an optical amplification medium, having a gain in a wavelength band of signal light, configured to receive the signal light; excitation light introduction means for introducing, into the optical amplification medium, excitation light to excite the optical amplification medium; and residual excitation light introduction means for introducing, into the optical amplification medium, residual excitation light output from the optical amplification medium, the residual excitation light having a wavelength component of the excitation light, wherein the residual excitation light introduction means includes, on a side of one end of the optical amplification medium, residual excitation light multiplexing means for multiplexing the signal light and the residual excitation light, and on a side of another end of the optical amplification medium, space propagation type wavelength demultiplexing means for wavelength-demultiplexing the signal light and the residual excitation light by means of a spatial optical system.

8 Claims, 8 Drawing Sheets

(51) Int. Cl.
*G02B 6/293* (2006.01)
*H01S 3/067* (2006.01)
*H01S 3/09* (2006.01)

(56) References Cited

U.S. PATENT DOCUMENTS

| | | | | |
|---|---|---|---|---|
| 2002/0159736 | A1* | 10/2002 | Dejneka | H01S 3/06716 385/127 |
| 2008/0056642 | A1* | 3/2008 | Byer | G02B 6/4296 385/27 |
| 2010/0079855 | A1* | 4/2010 | Dong | H01S 3/06754 359/341.3 |
| 2013/0068937 | A1* | 3/2013 | Ryf | G02B 6/4206 385/3 |
| 2013/0088771 | A1* | 4/2013 | Li | H01S 3/2308 359/341.1 |
| 2014/0055843 | A1* | 2/2014 | Roland | H01S 3/06754 359/341.1 |
| 2016/0118762 | A1* | 4/2016 | Tadakuma | H01S 3/06783 359/341.1 |
| 2017/0294759 | A1* | 10/2017 | Qiao | H01S 3/10023 |

FOREIGN PATENT DOCUMENTS

| | | | |
|---|---|---|---|
| JP | H05-040283 | A | 2/1993 |
| JP | 2000-261078 | A | 9/2000 |
| JP | 2005-019501 | A | 1/2005 |
| JP | 2012-178478 | A | 9/2012 |
| JP | 2017-021070 | A | 1/2017 |
| JP | 2017005083 | A * | 1/2017 |

OTHER PUBLICATIONS

International Search Report for PCT Application No. PCT/JP2019/038083, mailed on Dec. 24, 2019.

English translation of Written opinion for PCT Application No. PCT/JP2019/038083, mailed on Dec. 24, 2019.

* cited by examiner

OPTICAL AMPLIFICATION APPARATUS AND OPTICAL AMPLIFICATION METHOD

This application is a National Stage Entry of PCT/JP2019/038083 filed on Sep. 27, 2019, which claims priority from Japanese Patent Application 2018-186581 filed on Oct. 1, 2018, the contents of all of which are incorporated herein by reference, in their entirety.

TECHNICAL FIELD

The present invention relates to an optical amplification apparatus and an optical amplification method, and particularly relates to an optical amplification apparatus and an optical amplification method using a multi-core optical fiber.

BACKGROUND ART

Expansion of a communication capacity in a core network has been demanded due to rapid expansion of mobile traffic and a video service, and the like. The demand for capacity expansion tends to continue in the future. Up to now, expansion of a communication capacity has been achieved by employing a time multiplexing technique and a wavelength multiplexing technique. The time multiplexing technique and the wavelength multiplexing technique have been applied to an optical communication system using a single-core optical fiber.

When a single-core optical fiber is used, there is a restriction on a multiplexing number of optical signals being able to be transmitted through a single core, in other words, a single optical fiber core. In recent years, the multiplexing number is about to reach a limit thereof. The limit on the multiplexing number is determined by a wavelength bandwidth usable in optical fiber communication, and input light intensity tolerance of the single-core optical fiber.

In such a situation, in order to further expand the communication capacity, a spatial multiplexing technique being a multiplexing technique of a dimension being different from a conventional multiplexing technique has been developed. In the spatial multiplexing technique, there are a multi-core technique of increasing the number of cores per optical fiber, and a multimode technique of increasing the number of propagation modes. Both of the number of cores and the number of modes being used in conventional optical fiber communication are one. Therefore, it is possible to dramatically expand a communication capacity by increasing the number of cores and the number of modes.

However, when the number of cores and the number of modes of an optical fiber are increased, it is not possible to use currently widespread optical transceivers and optical amplifiers as they are. This is because the currently spread optical transceivers and optical amplifiers have been developed for a single-core optical fiber, and do not have compatibility with a multi-core optical fiber and a multimode optical fiber. In view of the above, a technique for achieving an optical transceiver and an optical amplifier being suitable for a multi-core optical fiber and a multimode optical fiber has been proposed.

As an optical amplification method suitable for a multi-core optical fiber, there are two methods of a core excitation method and a cladding excitation method. In the core excitation method, an intensity of an optical signal to be optically transmitted through each core is individually amplified for each core by using an individual excitation light source. In the cladding excitation method, an intensity of an optical signal to be optically transmitted through each core is collectively amplified by using a common excitation light source.

In order to efficiently amplify a light intensity of an optical signal being transmitted through a multi-core optical fiber, the cladding excitation method of collectively amplifying an intensity of an optical signal to be optically transmitted through each core by using a common excitation light source is desirable. In the cladding excitation method, in principle, it is possible to use a configuration of an optical amplifier based on a conventional single-core excitation method as it is, as a configuration of an optical amplifier based on the cladding excitation method.

PTL 1 describes one example of an optical amplifier based on such a cladding excitation method.

The relevant optical amplifier described in PTL 1 includes a multi-core optical fiber 91, a pumping light source 92, an optical isolator 94, an optical multiplexer 93, and multi-core optical fibers 97 #1 and 97 #2. Herein, the multi-core optical fiber 91 is configured in such a way that a plurality of cores 11 doped with a rare earth ion are disposed within a first clad 12, and a second clad 13 being disposed around the first clad 12 and reflecting excitation light having a wavelength for exciting the rare earth ion is provided. The plurality of cores 11 are configured in such a way as to have a core-to-core distance at which propagation light is coupled.

In this way, since the relevant optical amplifier employs coupling the cores 11 #1 to 11 #6 being included in the multi-core optical fiber 91, it is possible to suppress occurrence of a gain difference among the cores 11 at a time of amplifying propagation light propagating through the multi-core optical fiber 91.

CITATION LIST

Patent Literature

[PTL 1] Japanese Unexamined Patent Application Publication No. 2017-21070

SUMMARY OF INVENTION

Technical Problem

In an optical amplifier based on the cladding excitation method as exemplified by the above-described relevant optical amplifier, since a power density of excitation light within the first clad is small, absorption efficiency of an excitation light component in an optical amplification medium becomes lower than absorption efficiency based on the core excitation method. Therefore, as compared with the core excitation method, in the optical fiber amplifier based on the cladding excitation method, light intensity amplification efficiency becomes extremely low.

In this way, since an optical amplifier employing a multi-core optical fiber has low absorption efficiency of excitation light in an optical amplification medium based on the cladding excitation method, there is a problem that light intensity amplification efficiency is lowered.

An object of the present invention is to provide an optical amplification apparatus and an optical amplification method that solve a problem being the above-described problem that, in an optical amplifier employing a multi-core optical fiber, light intensity amplification efficiency is lowered, since absorption efficiency of excitation light in an optical amplification medium is low in the cladding excitation method.

Solution to Problem

An optical amplification apparatus according to the present invention includes an optical amplification medium, having a gain in a wavelength band of signal light, configured to receive the signal light; excitation light introduction means for introducing, into the optical amplification medium, excitation light to excite the optical amplification medium; and residual excitation light introduction means for introducing, into the optical amplification medium, residual excitation light output from the optical amplification medium, the residual excitation light having a wavelength component of the excitation light, wherein the residual excitation light introduction means includes, on a side of one end of the optical amplification medium, residual excitation light multiplexing means for multiplexing the signal light and the residual excitation light, and on a side of another end of the optical amplification medium, space propagation type wavelength demultiplexing means for wavelength-demultiplexing the signal light and the residual excitation light by means of a spatial optical system.

An optical amplification method according to the present invention includes introducing signal light into an optical amplification medium having a gain in a wavelength band of the signal light; introducing, into the optical amplification medium, excitation light to excite the optical amplification medium; and introducing, into the optical amplification medium, residual excitation light output from the optical amplification medium, the residual excitation light having a wavelength component of the excitation light, wherein the introducing of the residual excitation light into the optical amplification medium includes multiplexing, on a side of one end of the optical amplification medium, the signal light and the residual excitation light, and wavelength-demultiplexing, on a side of another end of the optical amplification medium, the signal light and the residual excitation light by means of a spatial optical system.

Advantageous Effects of Invention

An optical amplification apparatus and an optical amplification method according to the present invention are able to increase absorption efficiency of excitation light in an optical amplification medium, and improve light intensity amplification efficiency, even when an optical amplifier including a multi-core optical fiber is employed based on the cladding excitation method.

EXAMPLE EMBODIMENT

In the following, example embodiments according to the present invention are described with reference to the drawings.

First Example Embodiment

Figure 1:
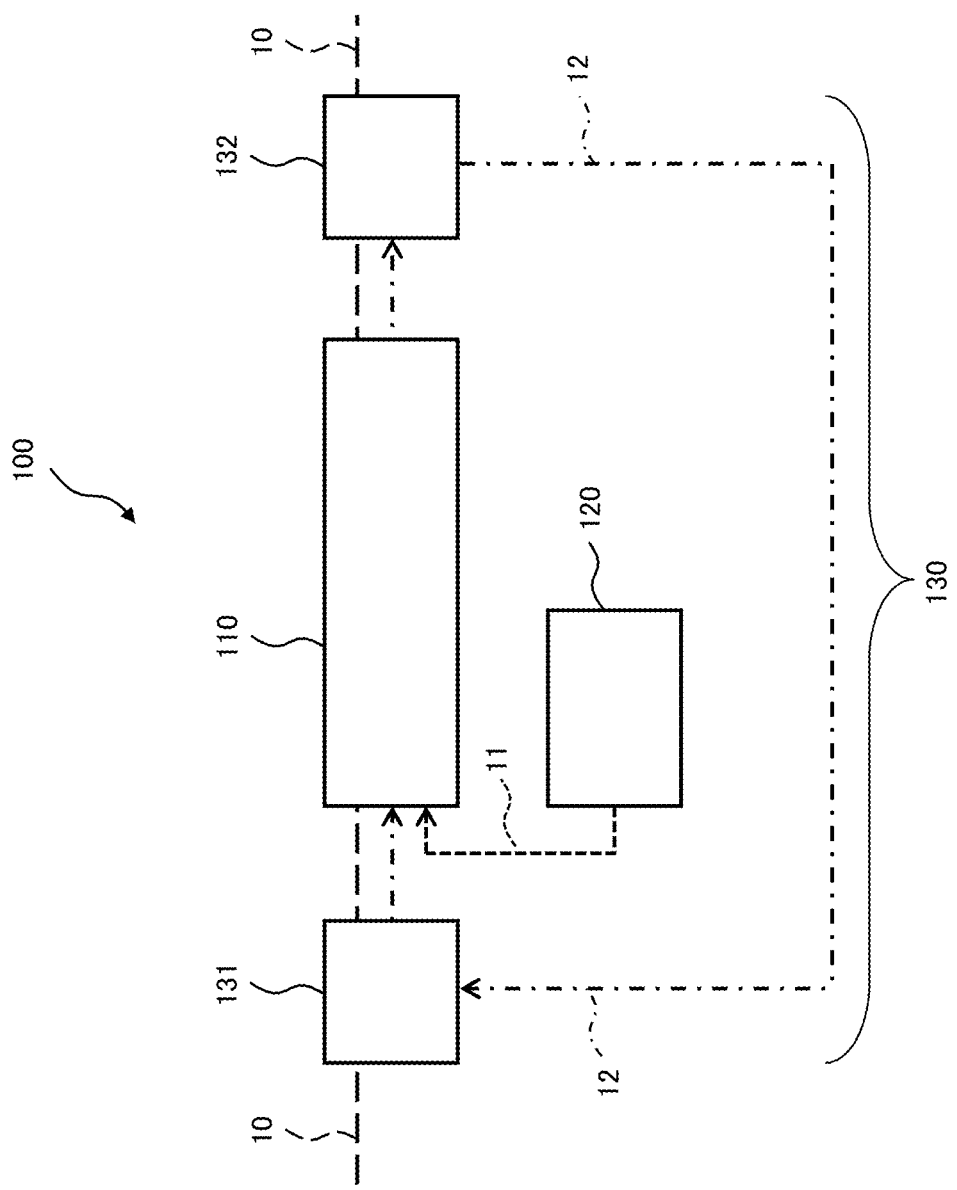
FIG. 1 is a block diagram illustrating a configuration of an optical amplification apparatus according to a first example embodiment of the present invention.

FIG. 1 is a block diagram illustrating a configuration of an optical amplification apparatus 100 according to a first example embodiment of the present invention.

The optical amplification apparatus 100 includes an optical amplification medium 110, an excitation light introduction means 120, and a residual excitation light introduction means 130. The optical amplification medium 110 has a gain in a wavelength band of signal light 10, and receives the signal light 10. The excitation light introduction means 120 introduces, into the optical amplification medium 110, excitation light 11 for exciting the optical amplification medium 110. The residual excitation light introduction means 130 introduces, into the optical amplification medium 110, residual excitation light 12 output from the optical amplification medium 110 and including a wavelength component of the excitation light 11.

Herein, the residual excitation light introduction means 130 includes, on a side of one end of the optical amplification medium 110, a residual excitation light multiplexing means 131 for multiplexing the signal light 10 and the residual excitation light 12. The residual excitation light introduction means 130 includes, at the other end of the optical amplification medium 110, a space propagation type wavelength demultiplexing means 132 for wavelength-demultiplexing the signal light 10 and the residual excitation light 12 by means of a spatial optical system.

In this way, since the optical amplification apparatus 100 according to the present example embodiment includes the residual excitation light introduction means 130, it is possible to introduce again, into the optical amplification medium 110, excitation light output without being absorbed in the optical amplification medium 110, as residual excitation light. Specifically, it is possible to increase absorption efficiency of excitation light in the optical amplification medium by reusing the excitation light.

Herein, the space propagation type wavelength demultiplexing means 132 may be configured in such a way as to include a dichroic mirror. The dichroic mirror is able to reflect the residual excitation light 12 including a wavelength component of the excitation light 11, and pass the signal light 10.

As the optical amplification medium 110, a multi-core optical fiber having a core doped with a rare earth ion, and a double cladding structure may be employed. At this occasion, the excitation light introduction means 120 may be configured in such a way as to introduce the excitation light 11 into the optical amplification medium 110, based on a cladding excitation method in which excitation light is made incident on a double cladding structure.

Next, an optical amplification method according to the present example embodiment is described.

In the optical amplification method according to the present example embodiment, first, signal light is introduced into an optical amplification medium having a gain in a wavelength band of the signal light. Further, excitation light for exciting the optical amplification medium is introduced into the optical amplification medium. At this occasion, residual excitation light output from the optical amplification medium and including a wavelength component of the excitation light is introduced into the optical amplification medium. Herein, introducing the residual excitation light into the optical amplification medium includes multiplexing, on a side of one end of the optical amplification medium, the signal light and the residual excitation light, and separating, at the other end of the optical amplification medium, wavelengths of the signal light and the residual excitation light by means of a spatial optical system.

In this way, in the optical amplification method according to the present example embodiment, excitation light output without being absorbed in an optical amplification medium is introduced again into the optical amplification medium as residual excitation light. Therefore, it becomes possible to reuse the excitation light, and increase absorption efficiency of the excitation light in the optical amplification medium.

Separating the wavelengths by means of the above-described spatial optical system may include separating the wavelengths by means of a dichroic mirror.

In the optical amplification method according to the present example embodiment, introducing the signal light into the optical amplification medium includes introducing the signal light into a multi-core optical fiber having a core doped with a rare earth ion, and a double cladding structure. Excitation light may be introduced into the optical amplification medium, based on a cladding excitation method, at the time of introducing the excitation light into the optical amplification medium.

As described above, the optical amplification apparatus 100 and the optical amplification method according to the present example embodiment are able to increase absorption efficiency of excitation light in an optical amplification medium, even when an optical amplifier including a multi-core optical fiber is employed based on a cladding excitation method. Consequently, it is possible to improve light intensity amplification efficiency in the optical amplifier.

Second Example Embodiment

Figure 2:
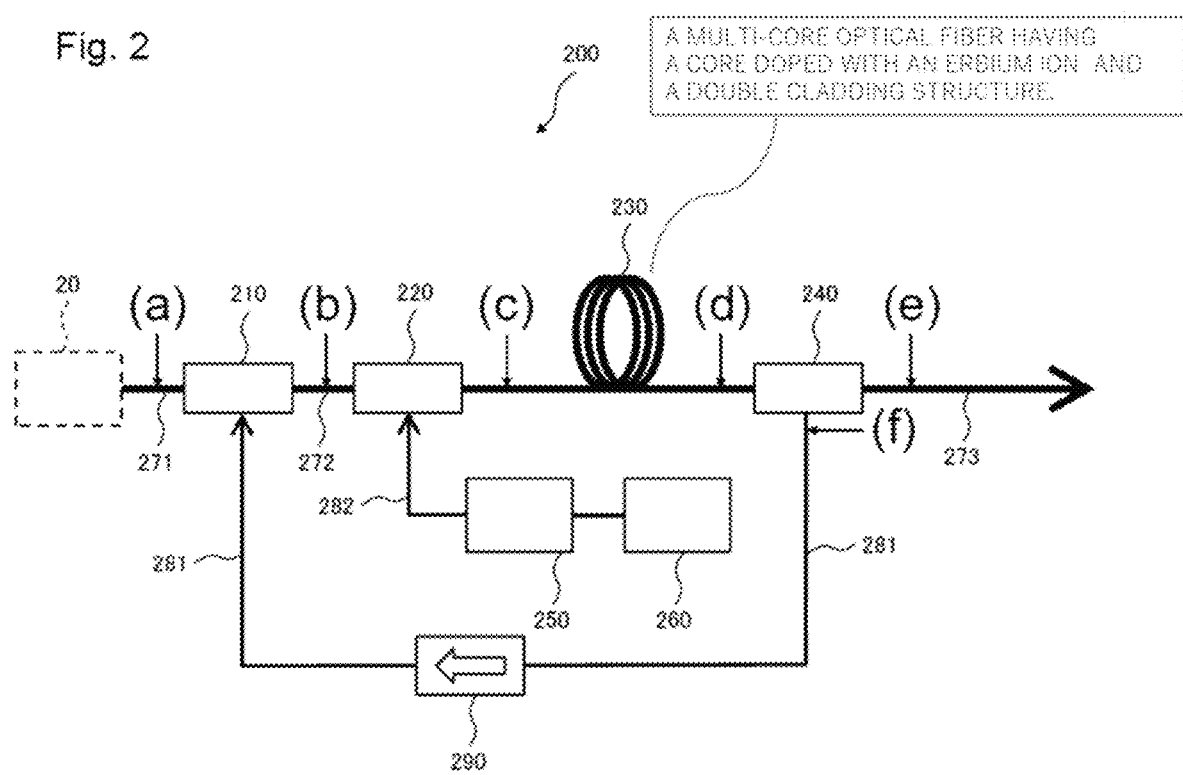
FIG. 2 is a block diagram illustrating a configuration of a multi-core optical amplifier according to a second example embodiment of the present invention.

Next, a second example embodiment according to the present invention is described. FIG. 2 illustrates a configuration of a multi-core optical amplifier 200 according to the present example embodiment.

The multi-core optical amplifier 200 according to the present example embodiment includes a first multiplexer (residual excitation light multiplexing means) 210, a second multiplexer (wavelength multiplexing means) 220, a multi-core erbium doped fiber (MC-EDF) 230 as an optical amplification medium, and a demultiplexer (space propagation type wavelength demultiplexing means) 240. Herein, the multi-core erbium doped fiber (MC-EDF) 230 is a multi-core optical fiber having a core doped with an erbium ion being a rare earth ion, and a double cladding structure. The multi-core optical amplifier 200 further includes an excitation light source 250, an excitation light control unit 260, multi-core optical fibers 271, 272, and 273, and multimode optical fibers 281 and 282.

In the multi-core optical amplifier 200, signal light output from a wavelength multiplexing light source 20 is input to the multi-core optical fiber 271. The input signal light passes through the first multiplexer 210, the multi-core optical fiber 272, the second multiplexer 220, the multi-core erbium doped fiber 230, the demultiplexer 240, and the multi-core optical fiber 273 in this order, and is output. Herein, the multi-core erbium doped fiber 230 as an optical amplification medium has a gain in a wavelength band of the signal light, and receives the signal light through the multi-core optical fibers 271 and 272.

The excitation light source (excitation light generating means) 250 generates excitation light, and outputs, to the multimode optical fiber 282, excitation light of a predetermined intensity under control of the excitation light control unit (excitation light control means) 260. The second multiplexer (wavelength multiplexing means) 220 multiplexes the signal light and the excitation light. Herein, the excitation light source (excitation light generating means) 250 and the second multiplexer 220 (wavelength multiplexing means) constitute an excitation light introduction means. Specifically, the excitation light introduction means introduces, into the multi-core erbium doped fiber 230 (optical amplification medium), excitation light for exciting the multi-core erbium doped fiber 230 (optical amplification medium). At this occasion, the excitation light introduction means introduces the excitation light into the multi-core erbium doped fiber 230 (optical amplification medium), based on a cladding excitation method.

By propagating signal light combined with excitation light through the multi-core erbium doped fiber 230, a light intensity of the signal light is amplified. In a process of propagating the excitation light through the multi-core erbium doped fiber 230, the signal light is amplified according to the excitation light being absorbed in the multi-core erbium doped fiber 230. Therefore, as an absorption rate of an excitation light component in the multi-core erbium doped fiber 230 increases, a larger light intensity amplification gain is acquired.

When it is assumed that an absorption rate of an excitation light component in the multi-core erbium doped fiber 230 is constant, as an intensity of excitation light increases, a larger light intensity amplification gain is acquired. As other parameters that affect the light intensity amplification gain, a length of the multi-core erbium doped fiber 230, a concentration of an erbium ion to be doped, and the like are exemplified. For example, when an absorption amount of an excitation light component by the multi-core erbium doped fiber 230 per unit length is small, increasing the length of the multi-core erbium doped fiber 230 enables increasing the excitation light component to be absorbed. However, the multi-core erbium doped fiber 230 has a property that a wavelength shift is caused in a gain spectrum, when the length of the multi-core erbium doped fiber 230 is increased. Therefore, there is a restriction on the length of the multi-core erbium doped fiber 230 and an amplification wavelength being that it is necessary to set the length suitable for the wavelength of signal light to be amplified. In the present example embodiment, description is made based on a premise that all the parameters other than a pumping intensity are optimized for signal light to be amplified. Specifically, it is assumed that the length of the multi-core erbium doped fiber 230 is adjusted in such a way as to maximize an amplification gain of signal light. Therefore, in this case, the light intensity amplification gain is in direct proportion to an excitation light intensity, and an absorption rate of excitation light in the multi-core erbium doped fiber 230.

The excitation light source 250 is driven by the excitation light control unit 260. Specifically, an output light intensity of the excitation light source 250 may be configured in such a way as to increase in proportion to drive current applied by the excitation light control unit 260. At this occasion, a driving condition of the excitation light source 250 necessary for acquiring a desired light intensity amplification gain, specifically, a relationship between a drive current value of the excitation light source and a light intensity amplification gain is acquired by measurement in advance. Therefore, when a desired light intensity amplification gain is determined, it is possible to derive required drive current of the excitation light source 250, specifically, electric power consumption necessary for driving the excitation light source 250.

An excitation light component that is not absorbed in the multi-core erbium doped fiber 230, specifically, a residual excitation light component is output from the multi-core erbium doped fiber 230 as it is, without contributing to amplifying an intensity of signal light. Herein, the demultiplexer (space propagation type wavelength demultiplexing means) 240 separates wavelengths of signal light and residual excitation light by means of a spatial optical system. Thereafter, the signal light passes through the multi-core optical fiber 273, and turns into an optical signal output of the multi-core optical amplifier 200. On the other hand, the residual excitation light reaches the first multiplexer 210 (residual excitation light multiplexing means) through the multimode optical fiber 281. The first multiplexer 210 (residual excitation light multiplexing means) combines the signal light and the residual excitation light.

Herein, the first multiplexer (residual excitation light multiplexing means) 210 and the demultiplexer (space propagation type wavelength demultiplexing means) 240 constitute a residual excitation light introduction means. The residual excitation light introduction means introduces, into the multi-core erbium doped fiber (optical amplification medium) 230, residual excitation light output from the multi-core erbium doped fiber (optical amplification medium) 230 and including a wavelength component of excitation light. Specifically, the residual excitation light introduction means includes, on a side of one end of the multi-core erbium doped fiber (optical amplification medium) 230, the first multiplexer 210 (residual excitation light multiplexing means), and at the other end of the multi-core erbium doped fiber (optical amplification medium) 230, the demultiplexer (space propagation type wavelength demultiplexing means) 240. In the present example embodiment, as will be described later, the demultiplexer (space propagation type wavelength demultiplexing means) 240 is configured in such a way as to have a function of converting spatial intensity distribution of residual excitation light.

The residual excitation light introduction means includes the multimode optical fiber 281 for guiding residual excitation light. As illustrated in FIG. 2, an optical isolator 290 for restricting a traveling direction of residual excitation light may be further provided. The optical isolator 290 enables preventing, in a regenerative loop path through which residual excitation light is supplied from the demultiplexer 240 to the first multiplexer 210, an operation of the multi-core optical amplifier 200 from being unstable due to reflection of the residual excitation light.

As described above, the first multiplexer 210 and the second multiplexer 220 are employed for multiplexing signal light and excitation light. At this occasion, in a similar way to the demultiplexer 240, a spatial optical system may also be employed in the first multiplexer 210, and an optical waveguide apparatus such as an optical coupler may also be employed. A multiplexer employing a spatial optical system is superior to a multiplexer of an optical waveguide type in all of heat resistance characteristics, heat dissipation characteristics, and light loss characteristics. On the other hand, although a multiplexer of an optical waveguide type has an advantage that miniaturization is available, a required performance may not be achieved in terms of heat resistance characteristics, heat dissipation characteristics, and light loss characteristics, and mounting may be difficult. In particular, when the input/output optical fibers (271 and 273) are multi-core fibers, it is difficult to acquire desired characteristics.

On the other hand, in the second multiplexer 220, it is not possible to use a multiplexer employing a spatial optical system. A reason for this is as follows. Signal light (typically, a wavelength of 1.5 µm) and excitation light (typically, a wavelength of 0.98 µm) are wavelength-multiplexed, and the multiplexed light passes through the multi-core optical fiber 272. When a multiplexer employing a spatial optical system is used as the second multiplexer 220, although it is possible to pass the signal light by reflection characteristics of a dichroic mirror provided inside the spatial optical system, it is not possible to pass the excitation light. In other words, the excitation light, which is wavelength-multiplexed by the first multiplexer 210, is blocked. Therefore, the second multiplexer 220 is needed to be a multiplexer of an optical waveguide type.

Next, an operation of the multi-core optical amplifier 200 according to the present example embodiment is described.

FIGS. 3A to 3F each illustrate light spectrum at each position of the multi-core optical amplifier 200 configured as described above. Specifically, FIGS. 3A to 3F each illustrate light spectrum at observation points (a) to (f) illustrated in FIG. 2.

Figure 3A:
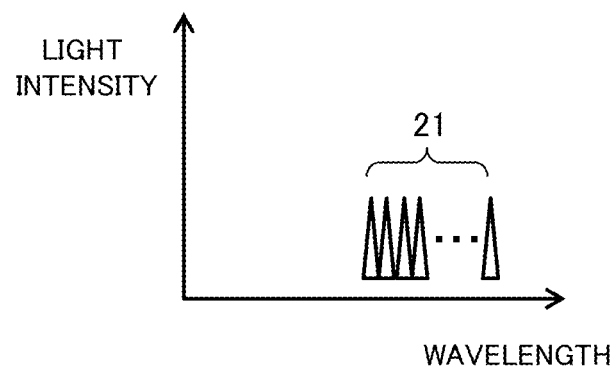
FIG. 3A is a diagram for describing an operation of the multi-core optical amplifier according to the second example embodiment of the present invention, and is a diagram illustrating a light spectrum at an observation point (a).
Figure 3B:
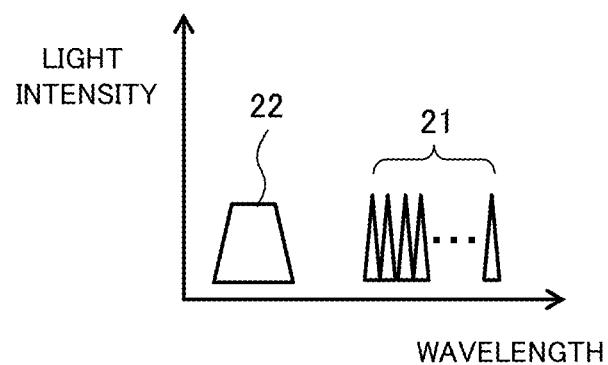
FIG. 3B is a diagram for describing an operation of the multi-core optical amplifier according to the second example embodiment of the present invention, and is a diagram illustrating a light spectrum at an observation point (b).
Figure 3C:
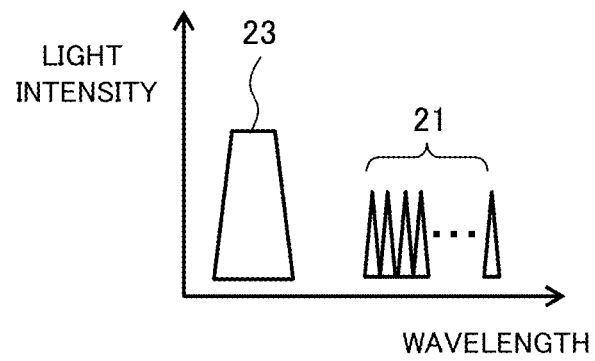
FIG. 3C is a diagram for describing an operation of the multi-core optical amplifier according to the second example embodiment of the present invention, and is a diagram illustrating a light spectrum at an observation point (c).

As illustrated in FIG. 3A, at the observation point (a), only wavelength-multiplexed signal light 21 output from the wavelength multiplexing light source 20 is observed. As illustrated in FIG. 3B, at the observation point (b), when residual excitation light is present, residual excitation light 22 is observed in addition to the wavelength-multiplexed signal light 21. As illustrated in FIG. 3C, at the observation point (c), when excitation light is supplied from the excitation light source 250, an excitation light component is observed. Herein, when a residual excitation light component is present, an excitation light component is added by the excitation light source 250, and thus an intensity of combined excitation light 23 observed at the observation point (c) becomes larger than an intensity of the residual excitation light 22 observed at the observation point (b).

Figure 3D:
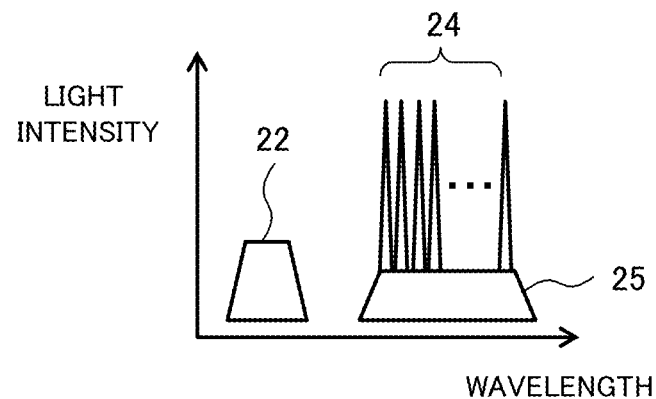
FIG. 3D is a diagram for describing an operation of the multi-core optical amplifier according to the second example embodiment of the present invention, and is a diagram illustrating a light spectrum at an observation point (d).

As illustrated in FIG. 3D, at the observation point (d), the residual excitation light 22 being an excitation light component that is not absorbed in the multi-core erbium doped fiber 230, amplified multiplexed signal light 24 being an amplified signal light component, and a light noise component 25 generated in a process of an optical amplification operation are observed. The light noise component 25 co-exists with the signal light component in a same wavelength band, and affects a noise index of the multi-core optical amplifier 200.

Figure 3E:
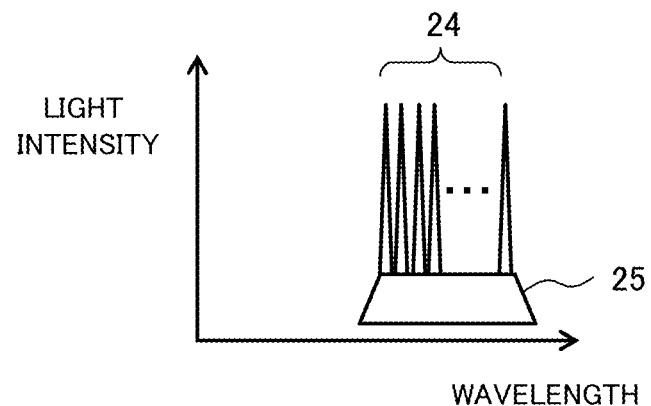
FIG. 3E is a diagram for describing an operation of the multi-core optical amplifier according to the second example embodiment of the present invention, and is a diagram illustrating a light spectrum at an observation point (e).
Figure 3F:
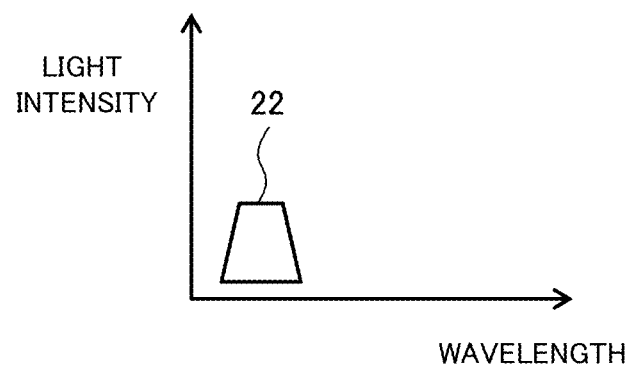
FIG. 3F is a diagram for describing an operation of the multi-core optical amplifier according to the second example embodiment of the present invention, and is a diagram illustrating a light spectrum at an observation point (f).

At a later stage of the multi-core erbium doped fiber 230, the demultiplexer 240 demultiplexes signal light and residual excitation light. Therefore, as illustrated in FIG. 3E, at the observation point (e), an excitation light component is not observed, and only the amplified multiplexed signal light 24 being a signal light component, and the light noise component 25 are observed. The residual excitation light 22 demultiplexed by the demultiplexer 240 is output from the multimode optical fiber 281. Therefore, as illustrated in FIG. 3F, at the observation point (f), only the residual excitation light 22 is observed.

As described above, a feature of the multi-core optical amplifier 200 according to the present example embodiment is that a regenerative path connected from the demultiplexer 240 to the first multiplexer 210 is present. As is clear from FIGS. 3B and 3C, the presence of the regenerative path enables regenerating and reusing residual excitation light. Specifically, since it is possible to add residual excitation light to an output from the excitation light source 250, even when drive current of the excitation light source 250 is decreased, it is possible to acquire a desired optical amplification gain. Specifically, light intensity amplification efficiency is improved, and it is possible to reduce electric power consumption necessary for acquiring a desired optical amplification gain.

In this way, the multi-core optical amplifier 200 according to the present example embodiment is able to reduce electric power consumption necessary for driving an excitation light source by improving absorption efficiency of excitation light in an optical amplification medium. Further, since it is possible to reduce a calorific value of an element constituting the excitation light source, it is also possible to reduce electric power consumption of an electric circuit necessary for cooling the element constituting the excitation light source. Therefore, electric power consumption of the entire optical amplifier can be significantly reduced.

As described above, the demultiplexer (space propagation type wavelength demultiplexing means) 240 included in the multi-core optical amplifier 200 according to the present example embodiment separates wavelengths of signal light and residual excitation light by means of a spatial optical system. Then, the signal light (typically, a wavelength $\lambda 1=1.5$ µm) is introduced into the multi-core optical fiber 273, and the residual excitation light (typically, a wavelength $\lambda 2=0.98$ µm) is introduced into the multimode optical fiber 281, respectively. Specifically, while signal light is output from a multi-core optical fiber and made incident on a multi-core optical fiber of a same type, residual excitation light is output from a multi-core optical fiber, and made incident on a multimode optical fiber being of a different type. A spatial light intensity distribution of light output from a multi-core optical fiber to the demultiplexer 240 is different for each wavelength. Therefore, even when signal light is appropriately coupled to a multi-core optical fiber, it is not always a case that residual excitation light is appropriately coupled to the multimode optical fiber 281.

However, in the present example embodiment, the demultiplexer (space propagation type wavelength demultiplexing means) 240 is configured in such a way as to have a function of converting spatial intensity distribution of residual excitation light. Therefore, it is possible to appropriately couple the residual excitation light to the multimode optical fiber 281, and efficiently regenerate and reuse the residual excitation light.

Specifically, the demultiplexer (space propagation type wavelength demultiplexing means) 240 may be configured in such a way as to include an optical lens system for converting spatial intensity distribution of residual excitation light in such a way that the residual excitation light is coupled to the multimode optical fiber (first residual excitation light waveguide means) 281. Herein, the multimode optical fiber (first residual excitation light waveguide means) 281 waveguides the residual excitation light from the demultiplexer 240 to the first multiplexer 210, and constitutes a residual excitation light introduction means.

Figure 4:
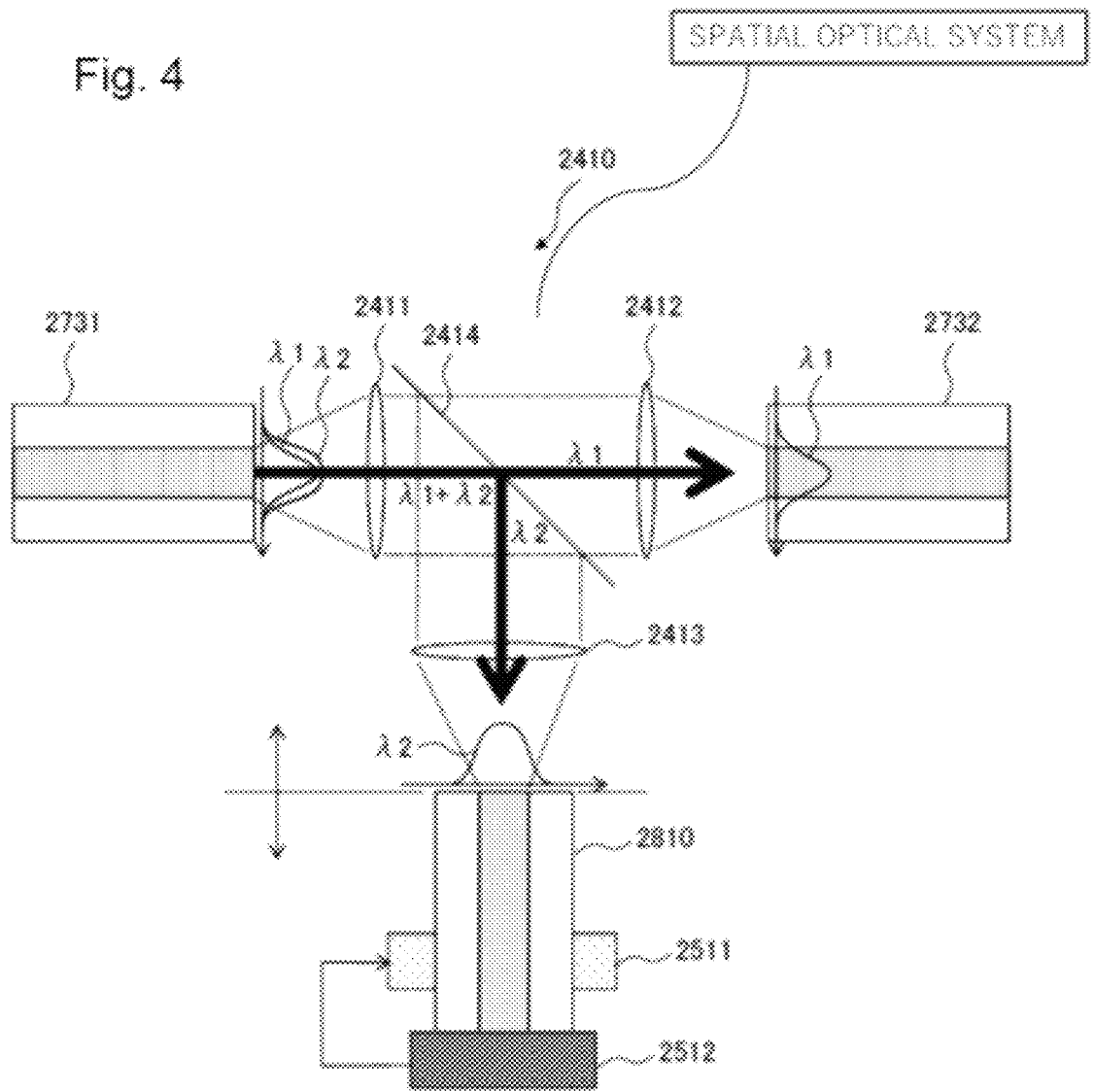
FIG. 4 is a block diagram illustrating a configuration of a demultiplexer including an optical lens system included in the multi-core optical amplifier according to the second example embodiment of the present invention.

FIG. 4 illustrates a configuration of a demultiplexer (space propagation type wavelength demultiplexing means) 2410 including an optical lens system. FIG. 4 also illustrates a first multi-core optical fiber 2731 on an incident side, a second multi-core optical fiber 2732 on an exit side, a multimode optical fiber 2810, and adjustment mechanisms (2511 and 2512).

The demultiplexer 2410 including an optical lens system includes a first lens 2411 on the incident side, a second lens 2412 on the exit side, a third lens 2413 on the exit side, and a dichromic mirror 2414. Wavelength-multiplexed light in which signal light (typically, the wavelength $\lambda 1=1.5$ µm) and residual excitation light (typically, the wavelength $\lambda 2=0.98$ µm) are multiplexed is incident from the first multi-core optical fiber 2731 to the demultiplexer 2410 including an optical lens system. The incident wavelength-multiplexed light is collimated by the first lens 2411, and the collimated light is incident on a dichroic mirror 2414.

Herein, the dichroic mirror 2414 reflects light having a specific wavelength (wavelength $\lambda 2=0.98$ µm in the example according to the present example embodiment), and transmits light having another wavelength (wavelength $\lambda 1=1.5$ µm in the example according to the present example embodiment). Therefore, the signal light $\lambda 1$ included in the wavelength-multiplexed light is transmitted through the dichroic mirror 2414, and coupled to the second multi-core optical fiber 2732 by means of the second lens 2412.

On the other hand, the residual excitation light $\lambda 2$ included in the wavelength-multiplexed light is reflected on the dichroic mirror 2414, and made incident on the third lens 2413. Herein, positioning of the multimode optical fiber 2810 is performed in such a way as to minimize coupled light loss of the residual excitation light $\lambda 2$ with respect to the multimode optical fiber 2810. For example, a movable stand 2511 may be used for the positioning.

As exemplified in FIG. 4, coupled light loss at this occasion can be acquired by, for example, measuring an intensity of residual excitation light with use of a light receiver 2512 at an output end of the multimode optical fiber 2810. However, the present example embodiment is not limited to the above and an intensity of residual excitation light may be measured by branching the multimode optical fiber 2810 at a midway thereof by tapping with use of an optical branching element or the like. The movable stand 2511 and the light receiver 2512 do not have to be always provided. The multimode optical fiber 2810 may be fixed at an appropriate position where coupled light loss is minimized, based on a measurement result.

As described above, in the demultiplexer 2410 including an optical lens system, it is possible to efficiently couple the residual excitation light $\lambda 2$ separated from the signal light $\lambda 1$ to the multimode optical fiber 2810. Therefore, it is possible to improve regeneration efficiency of residual excitation light in the multi-core optical amplifier 200.

There is a restriction, in terms of difficulty and the like in manufacturing, on a numerical aperture (NA) of the first multi-core optical fiber 2731, the second multi-core optical fiber 2732, and the multimode optical fiber 2810. Therefore, a restriction also occurs in focal lengths of the first lens 2411, the second lens 2412, and the third lens 2413 constituting an optical lens system. As a result, the demultiplexer 2410 including the optical lens system may be enlarged. However, the demultiplexer 2410 including the optical lens system has an advantage that it is possible to achieve a simplified configuration, once the optical lens system is designed.

The demultiplexer (space propagation type wavelength demultiplexing means) 240 may be configured in such a way as to include a spatial light modulator for converting spatial intensity distribution of residual excitation light in such a way that the residual excitation light is coupled to the multimode optical fiber (first residual excitation light waveguide means) 281. Herein, the multimode optical fiber (first residual excitation light waveguide means) 281 waveguides residual excitation light from the demultiplexer 240 to the first multiplexer 210, and constitutes a residual excitation light introduction means.

Figure 5:
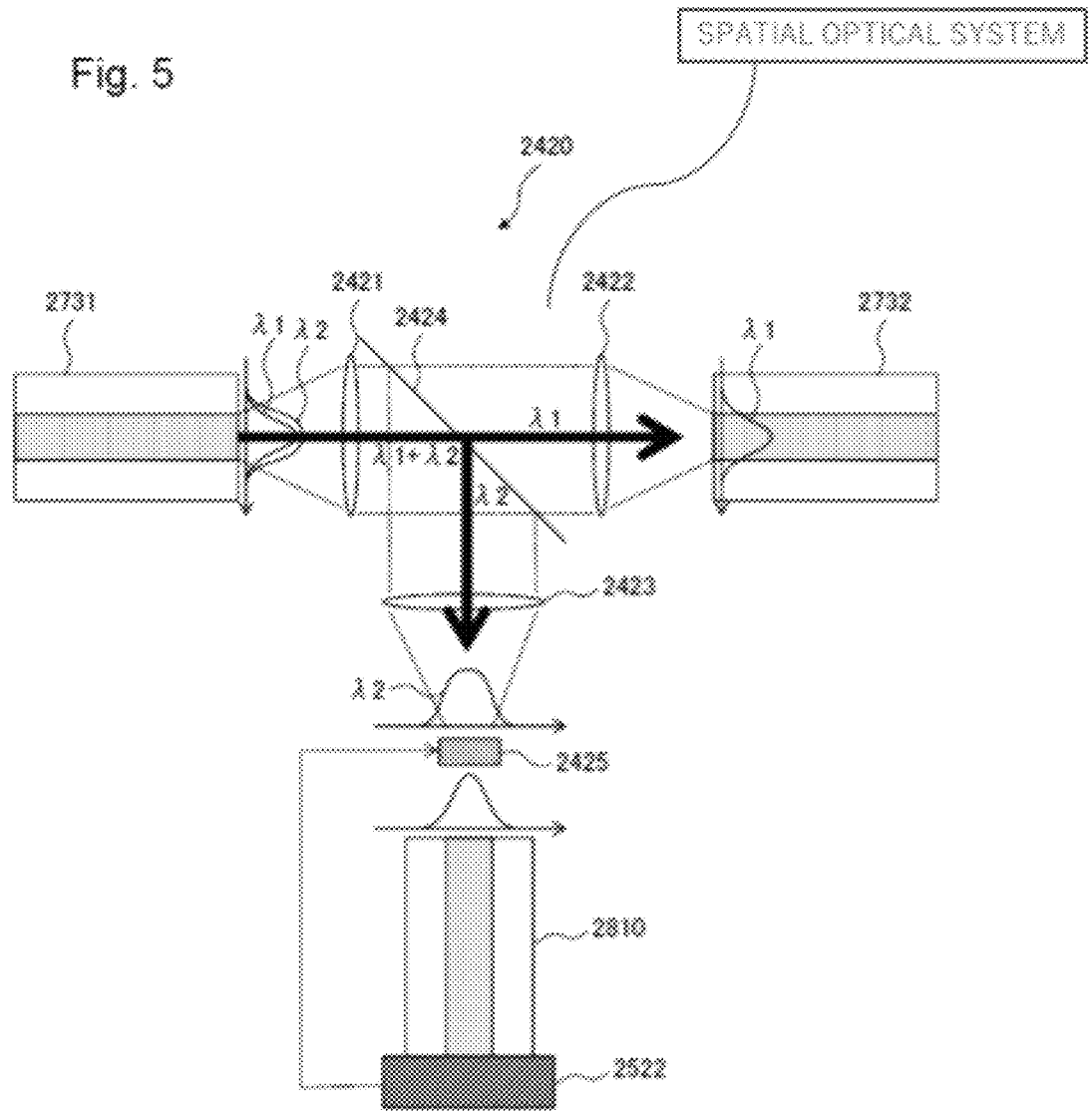
FIG. 5 is a block diagram illustrating a configuration of a demultiplexer including a spatial light modulator included in the multi-core optical amplifier according to the second example embodiment of the present invention.

FIG. 5 illustrates a configuration of a demultiplexer (space propagation type wavelength demultiplexing means) 2420 including a spatial light modulator. FIG. 5 also illustrates the first multi-core optical fiber 2731 on the incident side, the second multi-core optical fiber 2732 on the exit side, the multimode optical fiber 2810, and a light receiver 2522.

The demultiplexer 2420 including a spatial light modulator includes a first lens 2421 on the incident side, a second lens 2422 on the exit side, a third lens 2423 on the exit side, a dichroic mirror 2424, and a spatial light modulator 2425. Wavelength-multiplexed light in which signal light (typically, the wavelength $\lambda 1 = 1.5$ μm) and residual excitation light (typically, the wavelength $\lambda 2 = 0.98$ μm) are multiplexed is incident from the first multi-core optical fiber 2731 to the demultiplexer 2420 including a spatial light modulator. The incident wavelength-multiplexed light is collimated by the first lens 2421, and the collimated light is incident on the dichroic mirror 2424.

Herein, the dichroic mirror 2424 reflects light having a specific wavelength (wavelength $\lambda 2 = 0.98$ μm in the example according to the present example embodiment), and transmits light having another wavelength (wavelength $\lambda 1 = 1.5$ μm in the example according to the present example embodiment). Therefore, the signal light $\lambda 1$ included in the wavelength-multiplexed light is transmitted through the dichroic mirror 2424, and coupled to the second multi-core optical fiber 2732 by means of the second lens 2422.

On the other hand, the residual excitation light $\lambda 2$ included in the wavelength-multiplexed light is reflected on the dichroic mirror 2424, and made incident on the spatial light modulator 2425 through the third lens 2423. The spatial light modulator 2425 converts spatial intensity distribution of the residual excitation light $\lambda 2$ in such a way that the residual excitation light $\lambda 2$ is coupled to the multimode optical fiber 2810. Specifically, the demultiplexer 2420 including a spatial light modulator controls the spatial light intensity distribution of the residual excitation light $\lambda 2$ in such a way as to minimize coupled light loss of the residual excitation light $\lambda 2$ with respect to the multimode optical fiber 2810.

As exemplified in FIG. 5, coupled light loss at this occasion can be acquired by, for example, measuring an intensity of residual excitation light with use of the light receiver 2522 at an output end of the multimode optical fiber 2810. However, the present example embodiment is not limited to the above and an intensity of residual excitation light may be measured by branching the multimode optical fiber 2810 at a midway thereof by tapping with use of an optical branching element or the like. The light receiver 2522 does not have to be always provided. Specifically, a spatial light intensity distribution with which coupled light loss of residual excitation light with respect to the multimode optical fiber 2810 is minimized may be measured in advance, and a measurement result thereof may be stored in a memory or the like. Then, the spatial light modulator 2425 may be set by using the stored spatial light intensity distribution.

As described above, in the demultiplexer 2420 including a spatial light modulator, it is possible to efficiently couple the residual excitation light $\lambda 2$ separated from the signal light $\lambda 1$ to the multimode optical fiber 2810. The demultiplexer 2420 including a spatial light modulator increases the manufacturing cost, as compared with the demultiplexer 2410 including an optical lens system, because the spatial light modulator 2425 is provided. However, there is an advantage that a degree of freedom in designing a spatial optical system is increased as compared with the demultiplexer 2410 including an optical lens system, and mounting is made easy.

FIG. 2 illustrates a configuration of the multi-core optical amplifier 200 based on a forward pumping method in which propagating directions of signal light and excitation light are the same. However, the present example embodiment is not limited to the above and may be configured based on a backward pumping method in which a propagating direction of signal light is opposite to that of excitation light. In this case, whereas a loop for regenerating residual excitation light is clockwise in a case of the forward pumping method, the loop is counterclockwise in a case of the backward pumping method, and a similar advantageous effect is acquired.

Next, an optical amplification method according to the present example embodiment is described.

In the optical amplification method according to the present example embodiment, first, signal light is introduced into an optical amplification medium having a gain in a wavelength band of the signal light. Further, excitation light for exciting the optical amplification medium is introduced into the optical amplification medium. At this occasion, residual excitation light output from the optical amplification medium and including a wavelength component of the excitation light is introduced into the optical amplification medium. Herein, introducing the residual excitation light into the optical amplification medium includes multiplexing, on a side of one end of the optical amplification medium, the signal light and the residual excitation light, and separating, at the other end of the optical amplification medium, wavelengths of the signal light and the residual excitation light. The configuration so far is similar to that of the optical amplification method according to the first example embodiment.

In the optical amplification method according to the present example embodiment, spatial intensity distribution of residual excitation light is converted at the time of separating wavelengths by means of the above-described spatial optical system. Herein, spatial intensity distribution may be converted by means of an optical lens system in such a way that residual excitation light is waveguided through an optical waveguide medium at the time of separating wavelengths by means of a spatial optical system. Spatial intensity distribution may be converted by means of a spatial light modulator in such a way that residual excitation light is waveguided through an optical waveguide medium at the time of separating wavelengths by means of a spatial optical system.

Further, signal light and excitation light may be combined at the time of introducing the excitation light into an optical amplification medium.

As described above, in the multi-core optical amplifier 200 and the optical amplification method according to the present example embodiment, even when an optical amplifier including a multi-core optical fiber is employed based on a cladding excitation method, it is possible to increase absorption efficiency of excitation light in an optical amplification medium. Further, it is possible to improve regeneration efficiency of residual excitation light. Consequently, it is possible to improve light intensity amplification efficiency in the optical amplifier.

Third Example Embodiment

Figure 6:
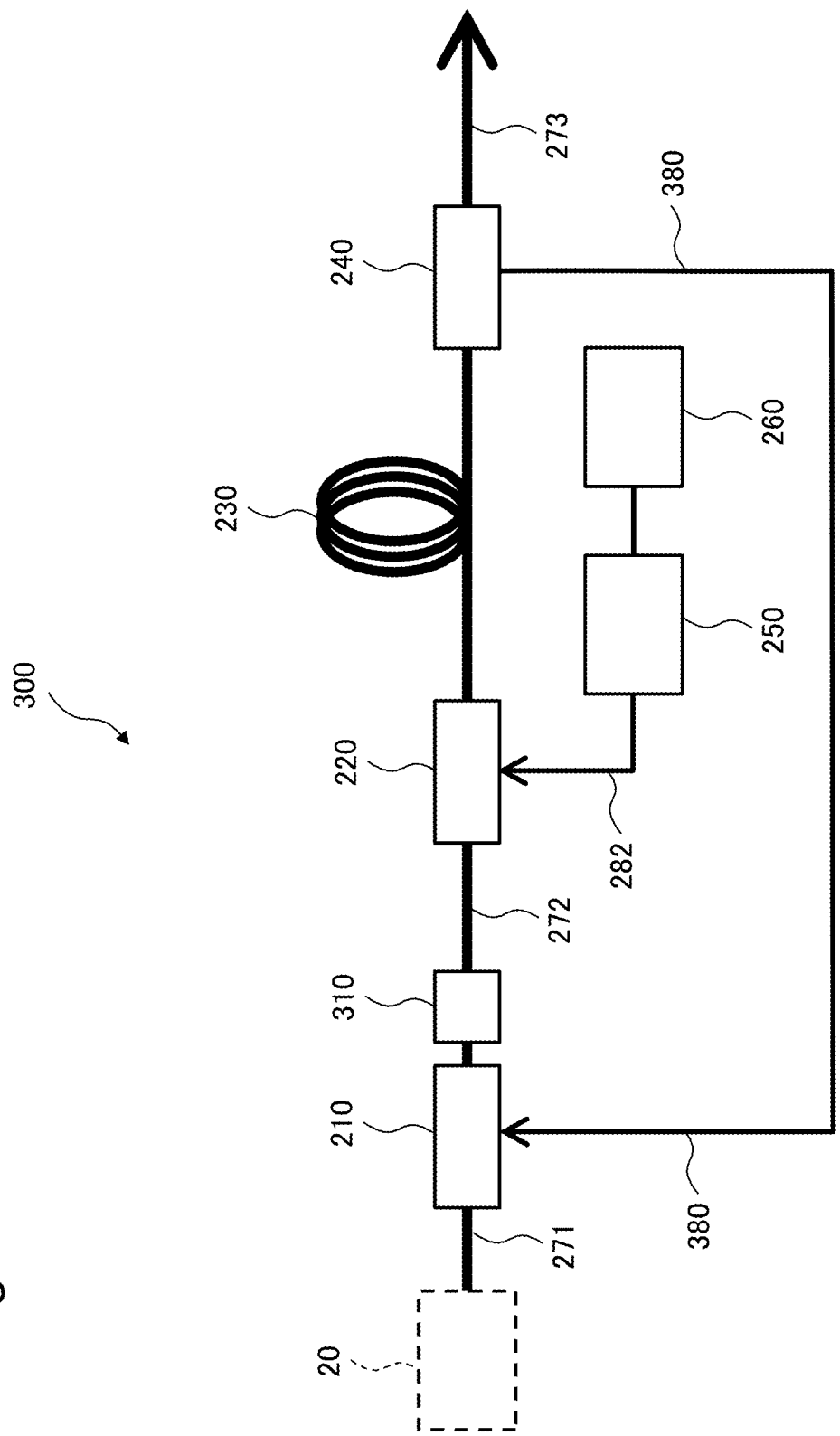
FIG. 6 is a block diagram illustrating a configuration of a multi-core optical amplifier according to a third example embodiment of the present invention.

Next, a third example embodiment according to the present example embodiment is described. FIG. 6 illustrates a configuration of a multi-core optical amplifier 300 according to the present example embodiment.

The multi-core optical amplifier 300 according to the present example embodiment includes a first multiplexer (residual excitation light multiplexing means) 210, a second multiplexer (wavelength multiplexing means) 220, a multi-core erbium doped fiber 230 as an optical amplification medium, and a demultiplexer (space propagation type wavelength demultiplexing means) 240. Herein, the demultiplexer 240 separates wavelengths of signal light and residual excitation light by means of a spatial optical system. The multi-core optical amplifier 300 further includes an excitation light source 250, an excitation light control unit 260, multi-core optical fibers 271, 272, and 273, and a multimode optical fiber 282. The configuration so far is similar to that of the multi-core optical amplifier 200 according to the second example embodiment.

The multi-core optical amplifier 300 according to the present example embodiment is configured in such a way as to further include a spatial optical modulator (spatial light modulating means) 310, and an optical fiber (second residual excitation light waveguide means) 380. Since the other configuration and operation of the multi-core optical amplifier 300 are similar to those of the multi-core optical amplifier 200 according to the second example embodiment, detailed description thereof is omitted.

The spatial light modulator (spatial light modulating means) 310 is disposed on an output side of the first multiplexer (residual excitation light multiplexing means) 210 from which residual excitation light is output, and has a function of converting spatial intensity distribution of the residual excitation light. Herein, the multi-core optical fiber 272 (multiplexed light waveguide means) waveguides signal light and residual excitation light which are combined in the first multiplexer (residual excitation light multiplexing means) 210. At this occasion, the spatial light modulator (spatial light modulating means) 310 converts spatial intensity distribution of the residual excitation light in such a way that the residual excitation light is coupled to the multi-core optical fiber 272 (multiplexed light waveguide means).

The optical fiber (second residual excitation light waveguide means) 380 waveguides residual excitation light from the demultiplexer 240 to the first multiplexer 210, and constitutes a residual excitation light introduction means. Herein, the optical fiber 380 is configured in such a way as to have a core diameter larger than a beam diameter of the residual excitation light.

Figure 7:
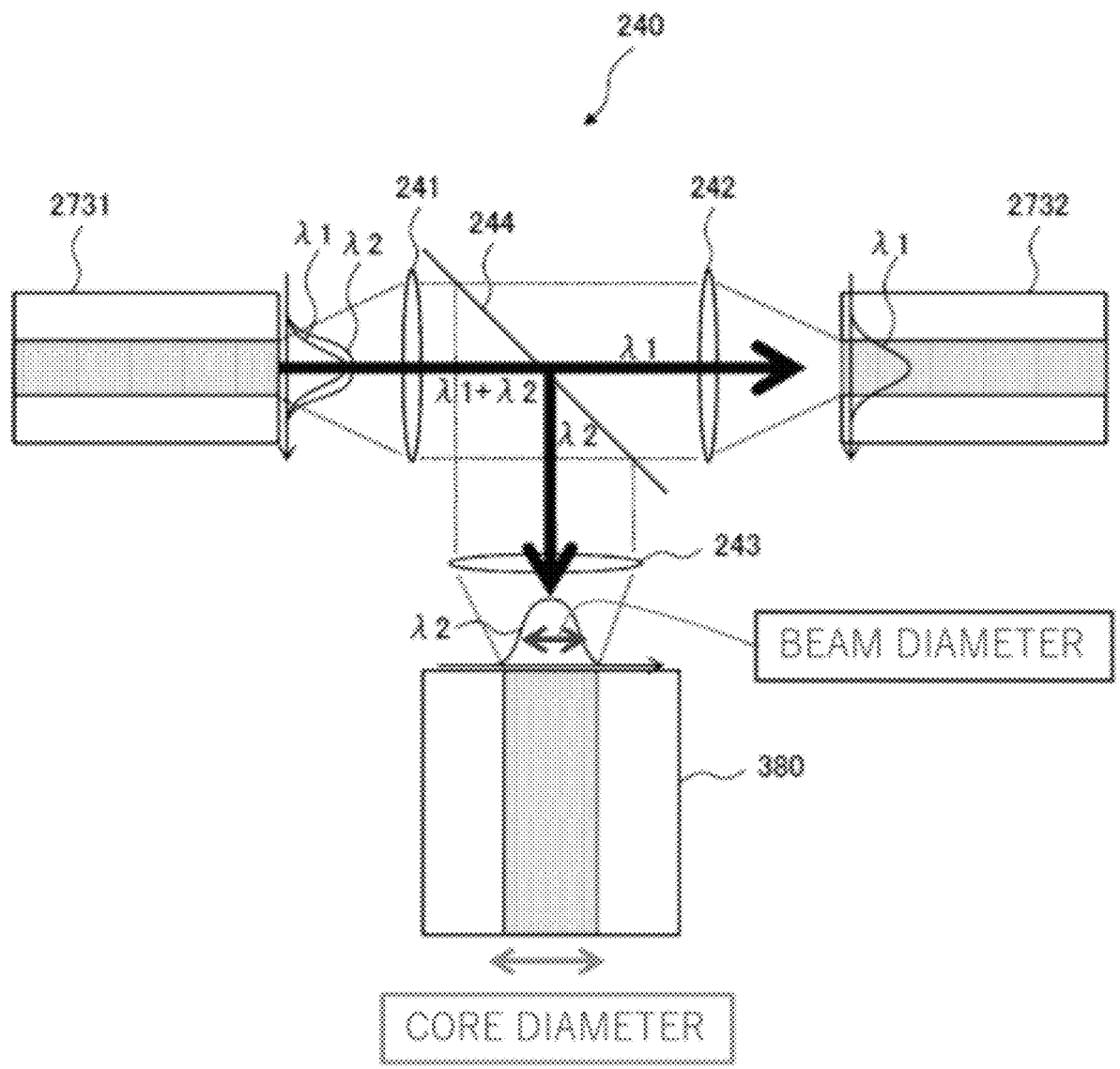
FIG. 7 is a block diagram for describing coupling residual excitation light to an optical fiber included in the multi-core optical amplifier according to the third example embodiment of the present invention.

Next, coupling residual excitation light output from the demultiplexer 240 to the optical fiber 380 is described with reference to FIG. 7. FIG. 7 also illustrates a first multi-core optical fiber 2731 on the incident side, and a second multi-core optical fiber 2732 on the exit side.

The demultiplexer 240 is configured in such a way as to include a first lens 241 on the incident side, a second lens 242 on the exit side, a third lens 243 on the exit side, and a dichromic mirror 244. Wavelength-multiplexed light in which signal light (typically, the wavelength $\lambda 1=1.5$ μm) and residual excitation light (typically, the wavelength $\lambda 2=0.98$ μm) are multiplexed is incident from the first multi-core optical fiber 2731 to the demultiplexer 240. The incident wavelength-multiplexed light is collimated by the first lens 241, and the collimated light is incident on a dichroic mirror 244.

Herein, the dichroic mirror 244 reflects light having a specific wavelength (wavelength $\lambda 2=0.98$ μm in the example according to the present example embodiment), and transmits light having another wavelength (wavelength $\lambda 1=1.5$ μm in the example according to the present example embodiment). Therefore, the signal light $\lambda 1$ included in the wavelength-multiplexed light is transmitted through the dichroic mirror 244, and coupled to the second multi-core optical fiber 2732 by means of the second lens 242.

On the other hand, the residual excitation light $\lambda 2$ included in the wavelength-multiplexed light is reflected on the dichroic mirror 244, and made incident on the third lens 243. Herein, since the optical fiber 380 has a core diameter larger than a beam diameter of residual excitation light, coupled light loss of the residual excitation light $\lambda 2$ with respect to the optical fiber 380 can be minimized. Specifically, it is possible to efficiently couple the residual excitation light $\lambda 2$ separated from the signal light $\lambda 1$ to the optical fiber 380. Therefore, it is possible to improve regeneration efficiency of residual excitation light in the multi-core optical amplifier 200.

Residual excitation light waveguided through the optical fiber 380 is combined with signal light in the first multiplexer 210, and the combined light is introduced into the multi-core optical fiber 272. At this occasion, since the spatial light modulator 310 converts spatial intensity distribution of the residual excitation light in such a way that the residual excitation light is coupled to the multi-core optical fiber 272, it is possible to minimize coupled light loss of the residual excitation light with respect to the multi-core optical fiber 272.

Since there is a restriction, in terms of manufacturing, on a core diameter and a numerical aperture (NA) of an optical fiber, there is also a restriction on optimizing the optical fiber 380. However, the multi-core optical amplifier 300 including the optical fiber 380 has an advantage that it is possible to achieve a simplified configuration.

Next, an optical amplification method according to the present example embodiment is described.

In the optical amplification method according to the present example embodiment, first, signal light is introduced into an optical amplification medium having a gain in a wavelength band of the signal light. Further, excitation light for exciting the optical amplification medium is introduced into the optical amplification medium. At this occasion, residual excitation light output from the optical amplification medium and including a wavelength component of the excitation light is introduced into the optical amplification medium. Herein, introducing the residual excitation light into the optical amplification medium includes multiplexing, on a side of one end of the optical amplification medium, the signal light and the residual excitation light, and separating, at the other end of the optical amplification medium, wavelengths of the signal light and the residual excitation light by means of a spatial optical system. The configuration so far is similar to that of the optical amplification method according to the first example embodiment.

In the optical amplification method according to the present example embodiment, spatial intensity distribution of residual excitation light is converted by a spatial light modulator in such a way that the residual excitation light is waveguided through an optical waveguide medium after signal light and the residual excitation light are combined at the time of introducing the residual excitation light into an optical amplification medium. At this occasion, residual excitation light, the wavelength of which is separated by a spatial optical system, may be waveguided through an optical fiber having a core diameter larger than a beam diameter of the residual excitation light.

As described above, in the multi-core optical amplifier 300 and the optical amplification method according to the present example embodiment, even when an optical amplifier including a multi-core optical fiber is employed based on a cladding excitation method, it is possible to increase absorption efficiency of excitation light in an optical amplification medium. Further, it is possible to improve regeneration efficiency of residual excitation light. Consequently, it is possible to improve light intensity amplification efficiency in the optical amplifier.

The whole or part of the example embodiments disclosed above can be described as, but not limited to, the following supplementary notes.

(Supplementary Note 1) An optical amplification apparatus comprising: an optical amplification medium, having a gain in a wavelength band of signal light, configured to receive the signal light; excitation light introduction means for introducing, into the optical amplification medium, excitation light to excite the optical amplification medium; and residual excitation light introduction means for introducing, into the optical amplification medium, residual excitation light output from the optical amplification medium, the residual excitation light having a wavelength component of the excitation light, wherein the residual excitation light introduction means includes, on a side of one end of the optical amplification medium, residual excitation light multiplexing means for multiplexing the signal light and the residual excitation light, and on a side of another end of the optical amplification medium, space propagation type wavelength demultiplexing means for wavelength-demultiplexing the signal light and the residual excitation light by means of a spatial optical system.

(Supplementary Note 2) The optical amplification apparatus according to supplementary note 1, wherein the space propagation type wavelength demultiplexing means has a function of converting spatial intensity distribution of the residual excitation light.

(Supplementary Note 3) The optical amplification apparatus according to supplementary note 2, wherein the residual excitation light introduction means includes first residual excitation light waveguide means for guiding the residual excitation light, and the space propagation type wavelength demultiplexing means includes an optical lens system configured to convert the spatial intensity distribution in such a way that the residual excitation light is coupled to the first residual excitation light waveguide means.

(Supplementary Note 4) The optical amplification apparatus according to supplementary note 2, wherein the residual excitation light introduction means includes first residual excitation light waveguide means for guiding the residual excitation light, and the space propagation type wavelength demultiplexing means includes a spatial light modulator configured to convert the spatial intensity distribution in such a way that the residual excitation light is coupled to the first residual excitation light waveguide means.

(Supplementary Note 5) The optical amplification apparatus according to supplementary note 1, further comprising: multiplexed light waveguide means for guiding the signal light and the residual excitation light multiplexed by the residual excitation light multiplexing means; and spatial light modulating means, disposed on an output side of the residual excitation light multiplexing means from which the residual excitation light is output, for having a function of converting spatial intensity distribution of the residual excitation light, wherein the spatial light modulating means converts the spatial intensity distribution in such a way that the residual excitation light is coupled to the multiplexed light waveguide means.

(Supplementary Note 6) The optical amplification apparatus according to supplementary note 5, wherein the residual excitation light introduction means includes a second residual excitation light waveguide means for guiding the residual excitation light, the second residual excitation light waveguide means includes an optical fiber, and the optical fiber has a core diameter larger than a beam diameter of the residual excitation light.

(Supplementary Note 7) The optical amplification apparatus according to any one of supplementary notes 1 to 6, wherein the excitation light introduction means includes excitation light generating means for generating the excitation light, and wavelength multiplexing means for multiplexing the signal light and the excitation light.

(Supplementary Note 8) The optical amplification apparatus according to any one of supplementary notes 1 to 7, wherein the space propagation type wavelength demultiplexing means includes a dichroic mirror.

(Supplementary Note 9) The optical amplification apparatus according to any one of supplementary notes 1 to 8, wherein the optical amplification medium is composed of a multi-core optical fiber including a core doped with a rare earth ion and a double cladding structure, and the excitation light introduction means introduces the excitation light into the optical amplification medium by a cladding excitation method.

(Supplementary Note 10) An optical amplification method comprising: introducing signal light into an optical amplification medium having a gain in a wavelength band of the signal light; introducing, into the optical amplification medium, excitation light to excite the optical amplification medium; and introducing, into the optical amplification medium, residual excitation light output from the optical amplification medium, the residual excitation light having a wavelength component of the excitation light, wherein the introducing of the residual excitation light into the optical amplification medium includes multiplexing, on a side of one end of the optical amplification medium, the signal light and the residual excitation light, and wavelength-demultiplexing, on a side of another end of the optical amplification medium, the signal light and the residual excitation light by means of a spatial optical system.

(Supplementary Note 11) The optical amplification method according to supplementary note 10, wherein the wavelength-demultiplexing by means of the spatial optical system includes converting spatial intensity distribution of the residual excitation light.

(Supplementary Note 12) The optical amplification method according to supplementary note 11, wherein the wavelength-demultiplexing by means of the spatial optical system includes converting the spatial intensity distribution by means of an optical lens system in such a way that the residual excitation light is guided through an optical waveguide medium.

(Supplementary Note 13) The optical amplification method according to supplementary note 11, wherein the wavelength-demultiplexing by means of the spatial optical system includes converting the spatial intensity distribution by means of a spatial light modulator in such a way that the residual excitation light is guided through an optical waveguide medium.

(Supplementary Note 14) The optical amplification method according to supplementary note 10, wherein the introducing of the residual excitation light into the optical amplification medium includes converting spatial intensity distribution of the residual excitation light by means of a spatial light modulator in such a way that the residual excitation light is guided through an optical waveguide medium after multiplexing the signal light and the residual excitation light.

(Supplementary Note 15) The optical amplification method according to supplementary note 14, wherein the introducing of the residual excitation light into the optical amplification medium includes guiding the residual excitation light wavelength-demultiplexed by means of the spatial optical system, through an optical fiber having a core diameter larger than a beam diameter of the residual excitation light.

(Supplementary Note 16) The optical amplification method according to any one of supplementary notes 10 to 15, wherein the introducing of the excitation light into the optical amplification medium includes multiplexing the signal light and the excitation light.

(Supplementary Note 17) The optical amplification method according to any one of supplementary notes 10 to 16, wherein the wavelength-demultiplexing by means of the spatial optical system includes wavelength-demultiplexing by means of a dichroic mirror.

(Supplementary Note 18) The optical amplification method according to any one of supplementary notes 10 to 17, wherein the introducing of the signal light into the optical amplification medium includes introducing the signal light into a multi-core optical fiber including a core doped with a rare earth ion and a double cladding structure, and the introducing of the excitation light into the optical amplification medium includes introducing the excitation light into the optical amplification medium by a cladding excitation method.

While the invention has been particularly shown and described with reference to exemplary embodiments thereof, the invention is not limited to these embodiments. It will be understood by those of ordinary skill in the art that various changes in form and details may be made therein without departing from the spirt and scope of the present invention as defined by the claims.

This application is based upon and claims the benefit of priority from Japanese patent application No. 2018-186581, filed on Oct. 1, 2018, the disclosure of which is incorporated herein in its entirety by reference.

REFERENCE SIGNS LIST

100 Optical amplification apparatus
110 Optical amplification medium
120 Excitation light introduction means
130 Residual excitation light introduction means
131 Residual excitation light multiplexing means
132 Space propagation type wavelength demultiplexing means
200, 300 Multi-core optical amplifier
210 First multiplexer
220 Second multiplexer
230 Multi-core erbium doped fiber
240 Demultiplexer
250 Excitation light source
260 Excitation light control unit
271, 272, 273 Multi-core optical fiber
281, 282 Multimode optical fiber
290 Optical isolator
310 Spatial light modulator
380 Optical fiber
2410 Demultiplexer including optical lens system
241, 2411, 2421 First lens
242, 2412, 2422 Second lens
243, 2413, 2423 Third lens
244, 2414, 2424 Dichroic mirror
2420 Demultiplexer including spatial light modulator
2425 Spatial light modulator
2511 Movable stand
2512, 2522 Light receiver
2731 First multi-core optical fiber
2732 Second multi-core optical fiber
2810 Multimode optical fiber
10 Signal light
11 Excitation light
12 Residual excitation light
20 Wavelength multiplexing light source
21 Wavelength-multiplexed signal light
22 Residual excitation light
23 Combined excitation light
24 Amplified multiplexed signal light
25 Light noise component

What is claimed is:
1. An optical amplification apparatus comprising:
an optical amplification medium, having a gain in a wavelength band of signal light, configured to receive the signal light;
an excitation light introduction unit configured to introduce, into the optical amplification medium, excitation light to excite the optical amplification medium; and
a residual excitation light introduction unit configured to introduce, into the optical amplification medium, residual excitation light output from the optical amplification medium,
the residual excitation light having a wavelength component of the excitation light, wherein the residual excitation light introduction unit includes:

on a side of one end of the optical amplification medium, a residual excitation light multiplexing unit configured to multiplex the signal light and the residual excitation light, the optical amplification apparatus further comprising:
a multiplexed light waveguide unit configured to guide the signal light and the residual excitation light multiplexed by the residual excitation light multiplexing unit; and
a spatial light modulating unit, disposed on an output side of the residual excitation light multiplexing unit from which the residual excitation light is output, having a function of converting spatial intensity distribution of the residual excitation light, and
the spatial light modulating unit converts the spatial intensity distribution in such a way that the residual excitation light is coupled to the multiplexed light waveguide unit.

2. The optical amplification apparatus according to claim 1, wherein
the residual excitation light introduction unit includes a second residual excitation light waveguide unit configured to guide the residual excitation light,
the second residual excitation light waveguide unit includes an optical fiber, and the optical fiber has a core diameter larger than a beam diameter of the residual excitation light.

3. The optical amplification apparatus according to claim 1, wherein
the excitation light introduction unit includes
an excitation light generating unit configured to generate the excitation light, and
a wavelength multiplexing unit configured to multiplex the signal light and the excitation light.

4. The optical amplification apparatus according to claim 1, wherein
the optical amplification medium is composed of a multi-core optical fiber including a core doped with a rare earth ion and a double cladding structure, and
the excitation light introduction unit introduces the excitation light into the optical amplification medium by a cladding excitation method.

5. An optical amplification method comprising:
introducing signal light into an optical amplification medium having a gain in a wavelength band of the signal light;
introducing, into the optical amplification medium, excitation light to excite the optical amplification medium; and
introducing, into the optical amplification medium, residual excitation light output from the optical amplification medium, the residual excitation light having a wavelength component of the excitation light, wherein
the introducing of the residual excitation light into the optical amplification medium includes:
multiplexing, on a side of one end of the optical amplification medium, the signal light and the residual excitation light; and
converting spatial intensity distribution of the residual excitation light via a spatial light modulator in such a way that the residual excitation light is guided through an optical waveguide medium after multiplexing the signal light and the residual excitation light.

6. The optical amplification method according to claim 5, wherein
the introducing of the residual excitation light into the optical amplification medium includes guiding the residual excitation light wavelength-demultiplexed via a spatial optical system, through an optical fiber having a core diameter larger than a beam diameter of the residual excitation light.

7. The optical amplification method according to claim 5, wherein
the introducing of the excitation light into the optical amplification medium includes multiplexing the signal light and the excitation light.

8. The optical amplification method according to claim 5, wherein
the introducing of the signal light into the optical amplification medium includes introducing the signal light into a multi-core optical fiber including a core doped with a rare earth ion and a double cladding structure, and
the introducing of the excitation light into the optical amplification medium includes introducing the excitation light into the optical amplification medium by a cladding excitation method.

* * * * *